June 21, 1932.    W. N. BOOTH    1,864,335
APPARATUS FOR THE ASSEMBLY OF WIRE WHEELS
Filed April 11, 1927    2 Sheets-Sheet 2
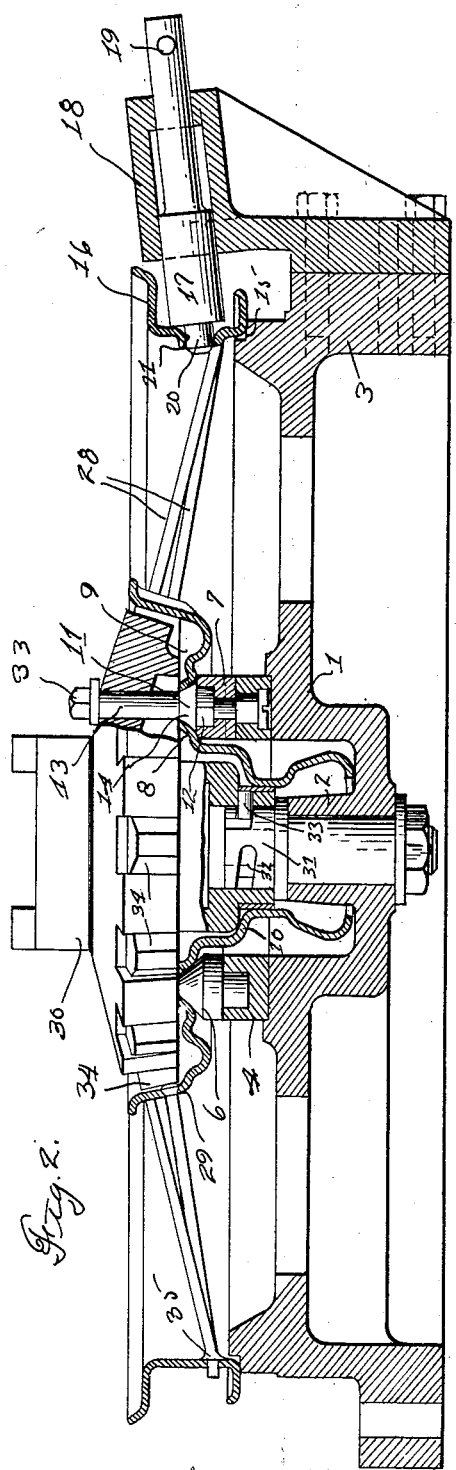
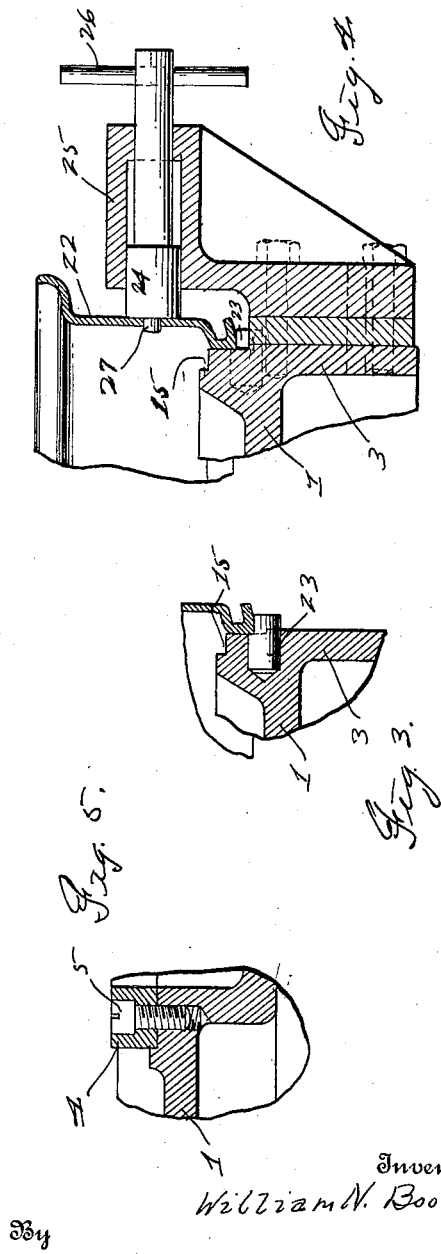
Inventor
William N. Booth
By
Attorney's Patented June 21, 1932

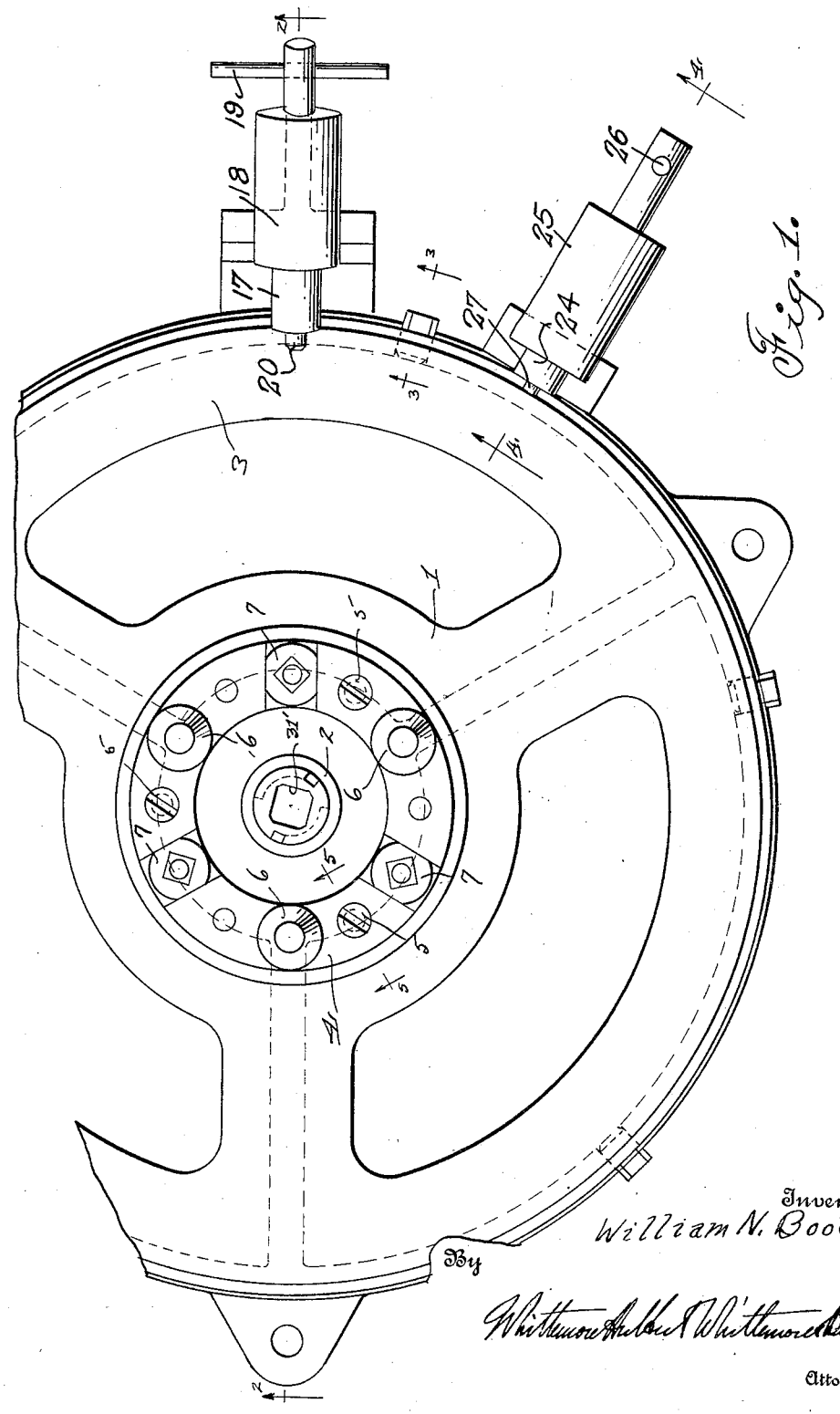

1,864,335

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

APPARATUS FOR THE ASSEMBLY OF WIRE WHEELS

Application filed April 11, 1927. Serial No. 182,824.

The invention relates to an apparatus for the assembly of wire wheels and has for some of its objects the provision of a simple construction for holding the rim and hub shell of a wire wheel during the initial assembly of the spokes therewith; the provision of an apparatus constructed to alternatively support different types of rims in their proper planes relative to the hub shell; the provision of an apparatus constructed to alternatively position different types of rims peripherally relative to the hub shell; and the provision of an apparatus constructed to cooperate with the chuck for holding the wire spokes in place. With these as well as other objects in view, the invention resides in the novel features of construction and combinations and arrangements of parts as more fully hereinafter set forth.

In the drawings:—

Figure 1 is a plan view of the apparatus embodying my invention;

Figures 2, 3 and 4 are cross sections respectively on the lines 2—2, 3—3 and 4—4 of Figure 1;

Figure 5 is a cross section on the line 5—5 of Figure 1.

In order to facilitate the assembly of wire wheels, I have provided an apparatus which holds the hub shell and rim of a wire wheel while the wire spokes are inserted into place and the heads at their inner ends are subsequently clamped against the hub shell. The apparatus in the present instance is for use during the assembly of the rear set of spokes with the hub shell and rim.

1 is the base of the apparatus having the axial hub 2 and the peripheral rim 3. This base has secured to its upper face and concentric with its hub the ring 4 as by means of the equi-distant cap screws 5. Mounted upon this ring are the equi-distant tapered buttons 6 and at equal distances between these buttons the socketed blocks 7, the latter having their lower ends non-rotatably engaging the ring 4. The buttons are engageable in the tapered annular or tubular driving projections 8 upon the radially extending flange 9 of the sheet metal hub shell 10 and as a result support this hub shell at a predetermined height and also in a predetermined angular position relative to the base. The socketed blocks 7 are located to engage the portions of the front face of the radially extending flange 9 surrounding the intermediate driving projections 8 and the sockets 11 in the upper faces of these blocks are polygonal and adapted to receive the polygonal shaped end portions 12 upon the heads of the bolts 13 which are adapted to extend upwardly through the tubular driving projections. The heads of these bolts are also provided with the tapered portions 14 for fitting the tubular projections.

The wire wheel may be made up with different types of rims engaging the outer ends of the wire spokes and with the same hub shell. The rim 3 is so constructed that it will alternatively support the different types of rims in their proper positions relative to the hub shell and as shown in Figure 2 the rim is provided with the annular shoulder 15 for engaging the front flange of the rim 16, which is in the nature of a metallic channel-shaped felly adapted to receive a demountable tire carrying rim. The shoulder 15 is located at a height to support the rim 16 in the proper plane relative to the hub and furthermore this shoulder is sufficiently laterally extended to freely support the rim so that the latter may bodily move in its plane. 17 is a plunger slidably mounted in the bracket 18 upon the rim and preferably having the handle 19 at its outer end and the reduced inner end 20 forming a pilot engageable with the valve stem opening 21 of the rim to peripherally position the latter. Inasmuch as the hub shell 10 is also peripherally positioned upon the base, the rear set of wire spokes may be quickly engaged in their proper openings in both the hub shell and rim.

For alternatively supporting and positioning the rim 22 which is in the nature of a continuous or solid base tire carrying rim, the rim 3, as shown in Figure 4, is provided with the series of transverse pins 23 extending outwardly beyond and located below the annular shoulder 15, these pins being adapted to engage the channel portion of the tire carrying rim and having a length sufficient to freely permit movement of the rim in its plane. These pins are so located that the rim is positioned in the proper plane relative to the hub shell. For peripherally positioning the rim, I have provided the plunger 24 slidably mounted in the bracket 25 and having the handle 26 at its outer end and the reduced inner end portion 27 constituting a pilot engageable with the valve stem opening in the rim. It will thus be seen that in the event that a continuous or solid base tire carrying rim is to be used instead of a rim forming a felly the fixture will properly locate this rim relative to the hub shell.

After the hub shell and the rim have been placed upon and positioned in the fixture the rear spokes 28 of the wire wheel may be then passed outwardly through the outer annular portion 29 upon the radially extending flange 9 of the hub shell and the tenons at their outer ends engaged in the proper holes in the rim. The wheel is now ready to receive a spoke holding chuck section 30 and in order to position this chuck section upon the fixture the fixture is provided with the pilot 31 upon the hub 2 and having the corresponding bayonet slots 32 for alternative engagement by the transverse pin 33 upon the chuck section, the diameter of the pilot being such that the pilot slidably engages within the front end of the chuck section at this time. The pilot is provided with a suitable axial polygonal shaped recess 31' in its upper end for engagement by a suitable tool adapted to be inserted through the chuck section and to rotate the pilot to secure the chuck section to the pilot. After the chuck section has been secured in place the nuts 33 may be tightened down upon the bolts 13 during which time these bolts are held from rotation by the socketed blocks 7. Then the plungers 34 of the chuck section may be forced outwardly to engage the heads upon the inner ends of the spokes and clamp the same against their seats in the outer annular portion 29 of the hub shell. During this step the shoulders formed by the enlargements 35 at the outer ends of the spokes may come into contact with the inner face of the rim to move the latter, this being permitted by reason of the rim being freely supported. The wheel as thus assembled with the chuck section may then be removed from the fixture, it being in condition for the next operation which consists in riveting the tenons at the outer ends of the spokes over upon the outer face of the rim.

What I claim as my invention is:

1. In an apparatus for the assembly of wire wheels having a rim with a valve stem hole and a hub shell with a tubular driving projection, the combination of means for supporting the rim, means engageable with the valve stem hole of the rim for peripherally positioning the same, and means engageable with the driving projection of the hub shell for peripherally positioning the same with respect to the rim.

2. In an apparatus for the assembly of wire wheels having a rim and a hub shell, the combination of a base for supporting the rim, buttons upon said base for supporting the hub shell, and a longitudinally movable plunger upon said base for engaging the valve stem hole of the rim.

3. In an apparatus for the assembly of wire wheels having a rim and a hub shell, the combination of a base for supporting the rim, a plunger upon said base for engaging the valve stem hole of the rim to peripherally position the latter, buttons upon said base and engageable with the hub shell to support and peripherally position the same, and a pilot upon said base engageable with a chuck for the hub shell.

4. In an apparatus for the assembly of wire wheels having a rim and a hub shell having a tubular driving projection, the combination of a base for supporting the rim, and a button upon said base engageable with the driving projection aforesaid for peripherally positioning the hub shell with respect to the rim.

5. In an apparatus for the assembly of wire wheels having a rim, a hub shell and spokes connecting the rim and hub shell, the combination of means for supporting and peripherally positioning the rim, means for supporting and peripherally positioning the hub shell, a chuck for holding the spokes in position relative to the hub shell, and means for supporting said chuck.

6. In an apparatus for the assembly of wire wheels having a rim, a hub shell and spokes connecting the rim and hub shell, the combination of means for supporting and peripherally positioning the rim, means for supporting and peripherally positioning the hub shell, a chuck for holding the spokes in fixed position relative to the hub shell, and means for supporting and peripherally positioning said chuck, said last-mentioned means cooperating with said second-mentioned means for holding the chuck in concentric relation to the hub shell.

7. In an apparatus for the assembly of wire wheels having a rim and a hub shell with a projecting portion, the combination of means for supporting and peripherally positioning the rim, and means including a member engageable with the projecting portion for supporting and peripherally positioning the hub shell.

8. In an apparatus for the assembly of wire wheels having a rim and a hub shell with an apertured portion, the combination of means for supporting and peripherally positioning the rim, and means including a member engageable with the apertured portion for supporting and peripherally positioning the hub shell.

9. In an apparatus for the assembly of wire wheels having a rim and a hub shell with an apertured portion, the combination of means for supporting the rim, a chuck for the hub shell and means for supporting the chuck in cooperative relation with the hub shell, means for securing the chuck to the hub shell including a threaded member extending through the apertured portion and means engageable with said threaded member for holding the same from rotation.

10. In an apparatus for the assembly of wire wheels having a rim, a hub shell and spokes connecting the rim and hub shell, the combination of means for positioning the hub shell and rim relative to each other, and means supported within said hub shell and engageable with the inner ends of the spokes for holding the latter in position relative to the hub shell.

11. In an apparatus for the assembly of wire wheels having a rim and hub shell, the combination of means for supporting the rim and hub shell, a chuck for holding the spokes of the wheel in position relative to the hub shell, means for securing the chuck to the hub shell including a pair of cooperating threaded members, and means engageable with one of said threaded members to hold the same from rotation while rotating the other member to secure the chuck to the hub shell.

12. In an apparatus for the assembly of wire wheels having a hub shell, the combination of means for supporting the hub shell of the wire wheel, and a second support having portions for positioning rims of different cross sectional areas in their proper planes relative to the hub shell.

13. In an apparatus for the assembly of wire wheels having a hub shell, the combination of means for supporting and peripherally positioning the hub shell of the wire wheel, a support having seat portions for supporting various types of rims in their proper planes relative to the hub shell, and means for peripherally positioning the different types of rims relative to the hub shell.

14. In an apparatus for the assembly of wire wheels having a hub shell, the combination of a base, a support upon the base having spaced portions for supporting different types of rims of the wire wheel, plungers upon said base for engaging in the valve stem holes in the different types of rims, and means upon the base for supporting and peripherally positioning the hub shell of the wire wheel relative to the plungers.

In testimony whereof I affix my signature.

WILLIAM N. BOOTH.